United States Patent [19]

Ueda

[11] Patent Number: 4,847,647
[45] Date of Patent: Jul. 11, 1989

[54] CAMERA FURNISHED WITH A ZOOM LENS SYSTEM AND A STROBE UNIT CAPABLE OF CHANGING ANGLE OF ILLUMINATION

[75] Inventor: Toshiaki Ueda, Tokyo, Japan

[73] Assignee: Asahi Kogaku Kogyo Kabushiki Kaisha, Tokyo, Japan

[21] Appl. No.: 236,877

[22] Filed: Aug. 26, 1988

[30] Foreign Application Priority Data

Aug. 27, 1987 [JP] Japan .................................. 62-213896

[51] Int. Cl.⁴ ............................................. G03B 15/02
[52] U.S. Cl. ................................ 354/149.1; 354/195.1
[58] Field of Search ............... 354/413, 419, 126, 141, 354/145.1, 149.1, 195.1

[56] References Cited

U.S. PATENT DOCUMENTS 3,798,668 3/1974 Hartmann ........................ 354/149.1

Primary Examiner—Michael L. Gellner
Attorney, Agent, or Firm—Sughrue, Mion, Zinn, Macpeak & Seas

[57] ABSTRACT

A camera having a zoom lens system and a built-in flash strobe unit for which the angle of illumination is automatically changed as zooming is effected, thereby to eliminate the "red-eye" effect. The strobe unit has a housing rotatably connected to the body of the camera through a support shaft. At least one of the strobe bulb, lens and reflector are movable through the rotation of a cam plate, the latter being rotatably driven by a cam mechanism and belt rotated by the drive mechanism which moves the zoom lens system.

4 Claims, 3 Drawing Sheets

CAMERA FURNISHED WITH A ZOOM LENS SYSTEM AND A STROBE UNIT CAPABLE OF CHANGING ANGLE OF ILLUMINATION

BACKGROUND OF THE INVENTION

The present invention relates to a camera furnished with a zoom lens and an electronic flash (or strobe) capable of changing the angle of illumination. In particular, the present invention relates to a camera furnished with an electronic flash (or strobe) capable of changing the angle of illumination in operative association with the zooming action.

Rangefinder-type cameras having a built-in assembly of automatic focusing and strobe units are popular today. The assignee of the present invention has successfully commercialized a rangefinder camera that also includes a zoom lens system capable of effecting continuous changes in the focal length. Japanese Patent Application No. 108278/1986 and many other patent applications have been filed on different aspects of this camera.

In these zoom lens camera models, the light-emitting portion of the strobe unit is positioned in front of the camera body. This light-emitting portion, which is composed of a Fresnel lens secured to the front face of the body of the camera and a light-emitting member that is a unitary assembly including a xenon lamp and a reflector, is formed in such a way that it is capable of moving back and forth relative to the Fresnel lens. The light-emitting member is designed to change the angle of illumination in operative association with the zooming action of the zoom lens system.

A camera having the light-emitting portion of a strobe unit fixed at a position close to the optical axis of the photographing lens has the disadvantage that it often causes the "red-eye" effect when a picture of a human subject is being taken with the strobe. The "red-eye" effect is a phenomenon in which the strobe emits rays of light traveling close to the optical axis of the photographing lens, which are reflected from the retina of the subject to produce a picture in which the pupil appears red due to the presence of blood vessels in the retina.

The red-eye effect can be prevented by moving the light-emitting portion of the strobe unit away from the optical axis of the photographing lens as far as possible. In consideration of this fact, the conventional zoom lens camera models manufactured by the assignee are designed in such a way that the light-emitting portion of the strobe unit is kept at a reasonable distance from the optical axis of the photographing lens. However, the distance from the light-emitting portion to the optical axis of the photographing lens cannot be increased indefinitely to prevent the red-eye effect completely.

SUMMARY OF THE INVENTION

The present invention has been accomplished in order to solve the aforementioned problem of the conventional camera furnished with a strobe unit that is capable of changing the angle of illumination. The principal object of the present invention is to provide a zoom lens camera that employs a simple mechanism that is capable of preventing the red-eye effect by keeping the light-emitting portion of the strobe as far as possible away from the optical axis of the photographing lens.

To attain the above and other objects, the present invention generally provides a camera that is furnished with a zoom lens system including movable lens groups capable of changing the focal length of the zoom lens system and a strobe unit capable of changing the illumination angle in response to a change in the focal length of the zoom lens system. More specifically, such a camera includes a strobe housing that incorporates a condenser lens, a light-emitter bulb and a reflector and which is rotatably supported to move between a position at which it is accommodated in the body of the camera and a position at which it protrudes therefrom, a mechanism in the strobe housing which changes the illumination angle by moving either one of the condenser lens, the light-emitting bulb and the reflector in either a forward or a backward direction along the optical axis, and a drive mechanism in the body of the camera for moving the zooming lens groups and which is operatively associated with the illumination angle changing mechanism by means of a belt transmission mechanism.

DESCRIPTION OF THE PREFERRED EMBODIMENTS

Figure 1:
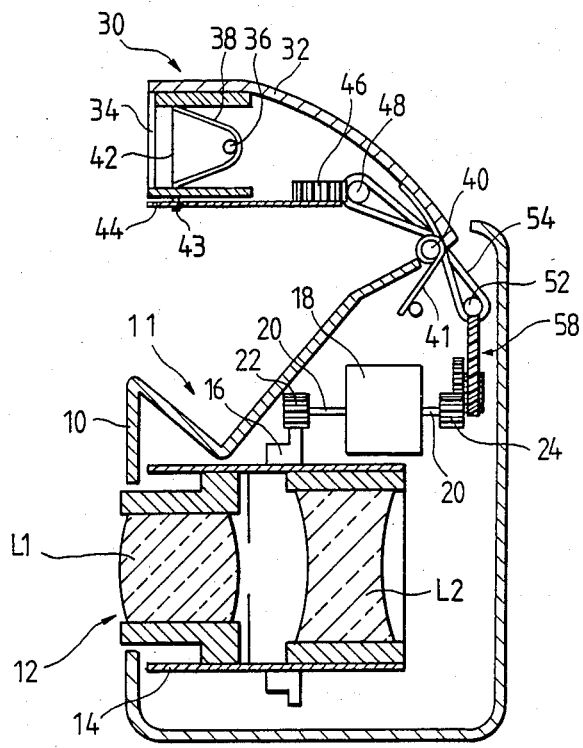
FIG. 1 is a side elevational sectional view showing essential components of a rangefinder-type zoom lens camera constructed according to a preferred embodiment of the present invention, with the strobe being shown protruding from the body of the camera.

The camera shown in FIG. 1 has a zoom lens system 12 secured to the front face of the camera body 10, with a strobe unit 30 being disposed on top of the zoom lens system 12. The zoom lens system 12 has a known lens composition including a front zooming lens group L1 and a rear zooming lens group L2, as well as a lens drive mechanism. The lens drive mechanism changes the focal length by allowing the two lens groups L1 and L2 to move either forward or backward in conformity with the rotation of a cam ring 14.

A rack 16 is secured to the outer circumference of the cam ring 14 and gears with a pinion 22 secured to the output shaft 20 of a drive unit 18 including a motor. In response to a zooming action, the drive unit 18 is actuated and the cam ring 14 rotates via the pinion 22 and the rack 16 in such a way that the lens groups L1 and L2 are moved either forward or backward to effect the intended zooming. In the embodiment under discussion, the lens groups L1 and L2 are retracted on the wide-angle side and advanced on the telephoto side.

The light-emitting portion of the strobe unit 30 includes a Fresnel lens 34 secured to an opening in the front face of the strobe housing 32 and a light-emitting bulb (xenon lamp) 36 and a reflector 38, the last-mentioned two components being disposed rearward of the Fresnel lens 34. The strobe housing 32 is rotatably supported on a shaft 40 along the edge of a compartment 11 formed on top of the zoom lens system 12 in the body 10. The strobe unit 32 is capable of freely moving between a position at which it is accommodated in the compartment 11 and a position at which it protrudes from the compartment 11 in such a way that the Fresnel lens 34 is made to face the subject. A torsion spring 41 is fitted over the support shaft 40 in such a way that, in order to move the strobe housing 32, it has a tendency to rotate in the direction which causes it to protrude from the compartment 11.

Although not shown, an engagement member is provided on the outer lateral side of the compartment 11 to help retain the strobe housing 32 in a position where it is accommodated in the compartment 11 as required.

The strobe unit 30 is equipped with a mechanism for changing the illumination angle, which is an important feature of the present invention. The xenon lamp 36 and the reflector 38 are secured to a light-emitting bulb retainer 42 to form a movable light-emitting member. The light-emitting bulb retainer 42 is installed in such a way that it is capable of moving linearly back and forth within the strobe housing 32.

A cam plate 44 in the form of a sector is disposed between the bottom face of the light-emitting bulb retainer 42 and the strobe housing 32. The cam plate 44 is rotatably supported on the strobe housing 32 by means of a shaft 45 which is inserted through the narrower part of the plate. A cam groove 44a is cut in the cam plate 44 and engages a follower pin 43 that is inserted into the groove and which is fixed in the bottom surface of the light-emitting bulb retainer 42. When the cam plate 44 rotates, the follower pin 43 moves either forward or backward in accordance with the contour of the cam groove 44a, thereby allowing the light-emitting retainer bulb 42 and the xenon lamp 36 to move either forward or backward in a similar way.

The shaft 45 on the cam plate 44 is furnished with a worm wheel 46 that rotates together with the cam plate 44. A follower shaft 48 that extends horizontally at right angles with respect to the optical axis is installed on the bottom surface of the strobe housing 32 in an area backward of the worm wheel 46. A worm 50 is secured to the follower shaft 48 and is drivingly engaged with the worm wheel 46.

The body 10 is furnished with a drive shaft 52 that extends parallel to the follower shaft 48, with the support shaft 40 being interposed therebetween. A pulley is secured to each of the shafts 48 and 52 and a belt 54 is wrapped around the pulleys. The belt 54 passes through a window 32a formed in the strobe housing 32 and spreads out in a diamond-like shape in such a way that both the tensioned and slack sides of the central portion are in contact with the support shaft 40.

A worm 56 is secured to he drive shaft 52 and a pinion 24 is secured to the output shaft 20 extending from the rear part of the drive unit 18. The worm 56 is connected to the pinion 24 via a reduction gear train 58 which forms a crossed helical gear unit in corporation with the drive shaft. When the drive unit 18 is actuated, the output shaft 20 starts to rotate to cause rotation of the cam ring 14.

At the same time, the rotational force is transmitted via the timing 54 to the cam plate 44, which then rotates to allow the light-emitting bulb retaining 42 to move either forward or backward depending on the direction in which the cam plate 44 rotates. As a result, the illumination angle of the strobe unit 30 is changed in accordance with the amount by which the focal length of the zoom lens system 12 is to be altered.

The operation of the embodiment described above is as follows.

Figure 4:
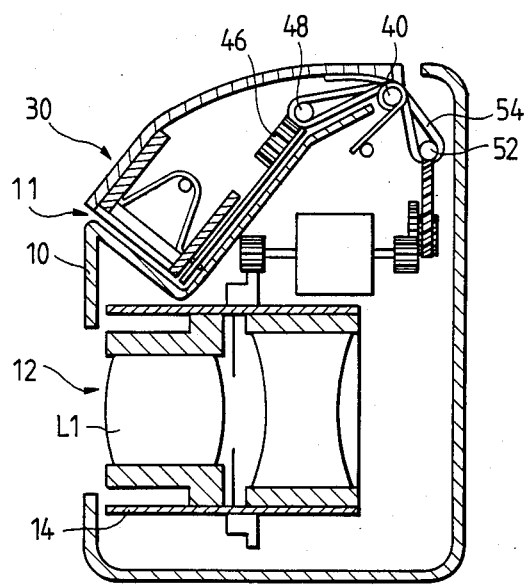
FIG. 4 is a side elevational sectional view of the camera with its light-emitting portion shown accommodated in the body of the camera.

Consider first the case where the strobe unit 30 is accommodated in the compartment 11 as shown in FIG. 4. If an engagement knob (not shown) is depressed, the urging force of the torsion spring 41 causes the strobe unit 30 to rotate clockwise (to rise to an upright position) so that it protrudes from the compartment 11, making the Fresnel lens 34 face the subject. In this process of raising the strobe unit 30, the tension of the belt 54 decreases because the angle of contact between the belt and the support shaft 40 becomes small. However, no difference in tension occurs between the tight and loose sides of the belt 54 since both sides are in uniform contact with the shaft 40. Therefore, even if the strobe housing 32 moves between a position at which it is accommodated in the compartment 11 and a position where it protrudes from the compartment, the cam plate 44 and hence the light-emitting bulb retainer 42 will not move, allowing the illumination angle of the strobe unit to remain unchanged.

Figure 2:
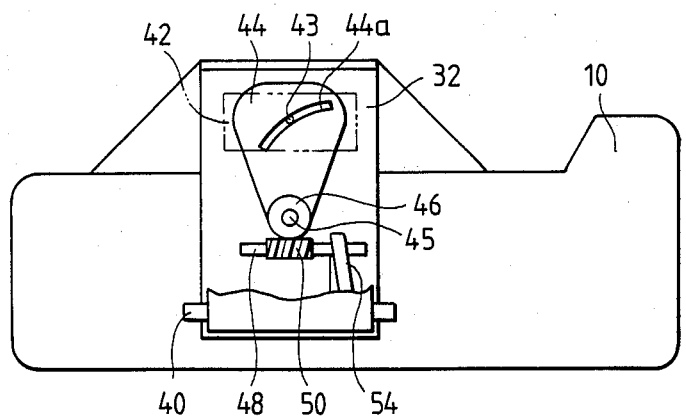
FIG. 2 is a plan view showing essential parts of the illumination angle changing mechanism of the strobe unit in the camera shown in FIG. 1.
Figure 3:
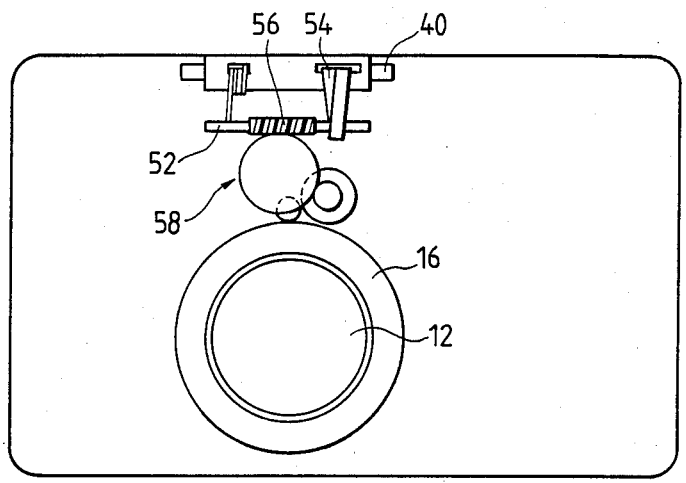
FIG. 3 is a rear view of the mechanism shown in FIG. 2.
Figure 5:
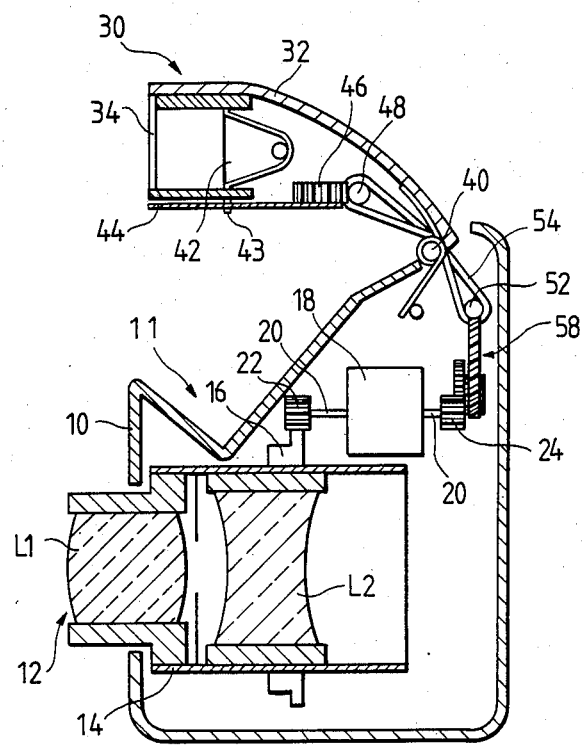
FIG. 5 is a side elevational sectional view of the camera with the strobe shown protruding from the body of the camera with the illumination angle being held to a minimum.

Let us then suppose that a zooming action is commenced from the state shown in FIG. 2 where the strobe housing 32 protrudes from the compartment 11 and the focal length is in the middle range. If zooming is effected toward the wide-angle (short focal-length) end, the cam plate 44 rotates counterclockwise and the follower pin 43 is advanced along the cam groove 44a, thereby allowing the light-emitting bulb retainer 42 to advance (see FIG. 1) in a direction that increases the angle of illumination. If zooming is effected toward the telephoto (long focal-length) end, the cam plate 44 rotates clockwise and the follower pin 43 is retracted along the cam groove 44a, thereby allowing the light-emitting bulb retainer 42 to retract (see FIG. 5) in a direction that decreases the angle of illumination. It should be noted here that the contour of the cam groove 44a and the angle through which the cam plate 44 rotates are associated with each other so that the change in the illumination angle of the strobe unit 30 will conform to the change in the focal length of the zoom lens system 12.

Although one preferred embodiment of the present invention has been described above the reference to the accompanying drawings, it should be understood that the present invention is by no means limited to this particular embodiment. In this embodiment, the xenon lamp 36 and the reflector 38 are moved in unison, but the illumination angle can be changed even if only of one of these members is moved. If desired, the Fresnel lens 34 above may be moved.

In the foregoing embodiment, the worms 50 and 56 are used as mechanisms for driving the cam plate 44 but other gear devices such as bevel gears may be employed. In the above-described embodiment, a cam mechanism is used to move the light-emitting bulb retainer 42. If desired, other mechanisms may be employed for this purpose. One example is a rack-and-pinion mechanism in which a pinion secured to the follower shaft 48 is engaged with a rack disposed on the light-emitting bulb retainer 42.

The concept of the present invention is applicable not only to a rangefinder-type zoom lens camera but also to other types of cameras including a single-lens reflex camera and a video camera.

As will be understood from the foregoing explanation, the present invention generally relates to a camera that is furnished with a zoom lens system including movable lens groups capable of changing the focal length and a strobe unit capable of changing the angle of illumination in response to a change in the focal length of the zoom lens system. More specifically, this camera includes a strobe housing that incorporates a condenser lens, a light-emitting bulb and a reflector and which is rotatably supported to move between a position at which it is accommodated in the body of the camera and a position at which it protrudes therefrom, a mechanism in the strobe housing which changes the illumination angle by moving one of the condenser lens, the light-emitting bulb and the reflector in either a forward or a backward direction along the optical axis, and a drive mechanism in the body of the camera for moving the zooming lens groups which is operatively associated with the illumination angle change mechanism by means of a belt transmission mechanism. In accordance with the present invention, the strobe housing can be kept sufficiently away from the optical axis to prevent the occurrence of the red-eye effect when pictures of a human subject are being taken with the strobe. As a further advantage, a simple construction is employed to render the strobe housing freely protrudable from the body of the camera without impairing the capability of the strobe unit to change the angle of illumination in response to any change in the focal length of the zoom lens system.

What is claimed is:

1. In a camera furnished with a zoom lens system including movable lens groups capable of changing a focal length and a strobe unit capable of changing an angle of illumination in response to a change in a focal length of the zoom lens system, the improvement comprising: a strobe housing, and a condenser lens, light-emitting bulb and reflector mounted in said housing, said housing being rotatably supported to move between a position at which it is accommodated in a body of the camera and a position at which it protrudes therefrom; means in said strobe housing for changing said illumination angle by moving one of said condenser lens, light-emitting bulb and reflector in a selected forward or backward direction along an optical axis of said camera; a belt transmission mechanism; and a drive mechanism in said body of the camera for moving said zooming lens groups and which is operatively associated with said illumination angle changing mechanism by said belt transmission mechanism.

2. The camera according to claim 1, further comprising a retainer for said light-emitting bulb, said retainer being capable of moving toward or away from said condenser lens, and wherein said condenser lens is secured to a front face of said strobe housing and said light-emitting bulb and reflector are secured to said retainer.

3. The camera according to claim 2, further comprising a support shaft for rotatably connecting said strobe housing to said body of said camera.

4. The camera according to claim 3, wherein said illumination angle changing mechanism comprises a cam plate rotatably supported on a shaft fixed to said strobe housing and a cam mechanism comprising a follower pin fixed to said light-emitting bulb retainer and movable forward or backward in response to rotation of said cam plate, a gear mechanism for rotatably driving said cam plate, a drive mechanism for moving said movable zooming lens groups, said drive mechanism having a drive shaft and said gear mechanism having a follower shaft, said drive shaft being positioned parallel to said support shaft, and a belt wrapped around said follower shaft and said drive shaft, tension and slack sides of said belt being in contact with said support shaft on said strobe housing.

* * * * *